(12) United States Patent
Feklistov

(10) Patent No.: US 7,643,230 B2
(45) Date of Patent: Jan. 5, 2010

(54) OPTICAL MOUNT FOR LASER ROD

(75) Inventor: Dmitri Feklistov, Grange (AU)

(73) Assignee: Ellex Medical Pty Ltd, Adelaide (AU)

( * ) Notice: Subject to any disclaimer, the term of this patent is extended or adjusted under 35 U.S.C. 154(b) by 0 days.

(21) Appl. No.: 12/066,117

(22) PCT Filed: Sep. 5, 2006

(86) PCT No.: PCT/AU2006/001300

§ 371 (c)(1),
(2), (4) Date: Mar. 7, 2008

(87) PCT Pub. No.: WO2007/028201

PCT Pub. Date: Mar. 15, 2007

(65) Prior Publication Data

US 2008/0247431 A1    Oct. 9, 2008

(30) Foreign Application Priority Data

Sep. 7, 2005    (AU) .............................. 2005904907

(51) Int. Cl.
*G02B 7/02*    (2006.01)
(52) U.S. Cl. ........................ 359/811; 359/817; 359/818

(58) Field of Classification Search ................. 359/811, 359/817, 818, 819, 823, 827
See application file for complete search history.

(56) References Cited

U.S. PATENT DOCUMENTS

| 6,603,614 B2 * | 8/2003 | Fulkerson et al. ............ 359/820 |
| 6,671,108 B2 * | 12/2003 | Koiwai et al. ................ 359/819 |
| 6,754,418 B1 | 6/2004 | Holm et al. |
| 7,349,166 B2 * | 3/2008 | Sakai et al. .................. 359/822 |
| 2004/0165625 A1 | 8/2004 | Momiuchi et al. |
| 2004/0258123 A1 | 12/2004 | Zamel et al. |

FOREIGN PATENT DOCUMENTS

| EP | 0847114 A1 | 6/1998 |
| JP | 07307507 A | 11/1995 |
| WO | 2006070548 A1 | 7/2006 |

* cited by examiner

*Primary Examiner*—Timothy J Thompson
(74) *Attorney, Agent, or Firm*—Krugliak, Wilkins, Griffiths & Dougherty Co., L.P.A.; David P. Dureska; Brent L. Moore

(57) ABSTRACT

An optical mount for holding an optical element, such as a laser rod, in which two or more contact blocks are biased into contact with two faces of the optical element and with a base supporting the optical element. The optical mount maintains good thermal contact with the optical element to minimize thermal gradients.

12 Claims, 2 Drawing Sheets

OPTICAL MOUNT FOR LASER ROD

CROSS-REFERENCE TO RELATED APPLICATIONS

This application claims the benefit of PCT Application Serial No. PCT/AU2006/001300 filed Sep. 5, 2006, and Australian Patent Application Serial No. 2005904907, filed Sep. 7, 2005.

This invention relates to an optical mount and in particular a mount to hold a laser rod.

BACKGROUND TO THE INVENTION

Optical devices, such as laser rods, operate in an environment that often has a rapidly changing and highly variable thermal environment. The thermal changes can induce thermo-optical and thermo-mechanical misalignment. It is important to maintain the optical element at the correct operating temperature to reduce thermal-induced misalignment and to avoid thermal stress, while maintaining stable mechanical location.

A particular example of the importance of thermal stability is a solid state laser system which is based upon optical excitation of a laser rod. The laser rod has a characteristic optical transition at a specific wavelength. It is well known that there are a number of factors that impact the lasing efficiency, lensing effects within the laser rod and the beam quality of the emitted radiation. For example, thermal-induced lensing and birefringence is a known problem in Nd:YAG.

As the laser rod is pumped with energy from the pump source, some of the energy is converted to heat which must be removed evenly from the laser rod to avoid thermal-optical misalignment and thermal-mechanical stress. To achieve this a good and even thermal conductivity is required from the entire surface of the optical element to an efficient heat sink. However, it has proven difficult to design a mount that achieves the desired thermal transfer properties without inducing mechanical stress due to clamping of the optical device to the mount. Furthermore, expansion and contraction of the rod due to the large thermal variation during pumping accentuates any mechanical stress that may be present and induces thermal stresses that are not present in the absence of the heat load.

The prior art approaches to mounting optical elements to dissipate heat loads include the use of a pair of matching 'V' blocks with the laser rod sandwiched therebetween. An example of this approach is described in U.S. Pat. No. 6,754,418. Heat is extracted from one or both of the 'V' blocks. Another example of using a pair of 'V' blocks is found in United States patent application 2004/0165625 where springs are used to maintain a holding piece (upper 'V' block) in place to reduce the risk of damage to the optical element when thermal expansion occurs. The main disadvantage of this design is that if thermal expansion occurs which is sufficient to cause the holding piece to push away from the holder (lower 'V' block), thermal transfer from the holding piece to the holder will be lost on one or both sides and poor thermal stability will result.

The prior art devices fail to maintain the required level of thermal stability.

OBJECT OF THE INVENTION

It is an object of the present invention to provide a thermally stable mount for optical devices.

Further objects will be evident from the following description.

DISCLOSURE OF THE INVENTION

In one form, although it need not be the only or indeed the broadest form, the invention resides in an optical mount comprising:

a base shaped to receive an optical element in close contact on two faces of the optical element;

two or more contact blocks shaped to contact the base and the optical element; and one or more bias means located to urge said contact blocks into contact with said optical element and said base.

Suitably the optical element is rectangular and the base is a 'V' block having a corner shape adapted to receive a corner of the optical element so that two faces of the optical element are in contact with the base. The contact blocks preferably have matching shaped faces so that at least one face is in contact with a face of the optical element and one face is in contact with the base.

The bias means are suitably springs which act against the contact blocks to push them towards the optical element and the base.

In a preferred form there is a clamping member that is bolted to the base and extends around, but spaced from, the contact blocks. In this form the bias means are springs located between the clamping member and the contact blocks.

The optical element is preferably a laser rod.

Heat transfer material may be applied between the faces of the contact blocks and the optical element, and between the contact blocks and the base.

The contact blocks and the base are suitably made from material with good thermal conductivity such as copper or aluminium.

The springs provide sufficient force against the contact blocks to maintain good thermal contact but allow for minor movement thereby compensating for thermal effects.

A key feature of this design is that both contact blocks can move independently and still maintain full contact, and therefore full and homogenous thermal transfer, with both the laser rod and the base.

BRIEF DETAILS OF THE DRAWINGS

To assist in understanding the invention preferred embodiments will now be described with reference to the following figures in which.

DETAILED DESCRIPTION OF THE DRAWINGS

Figure 1:
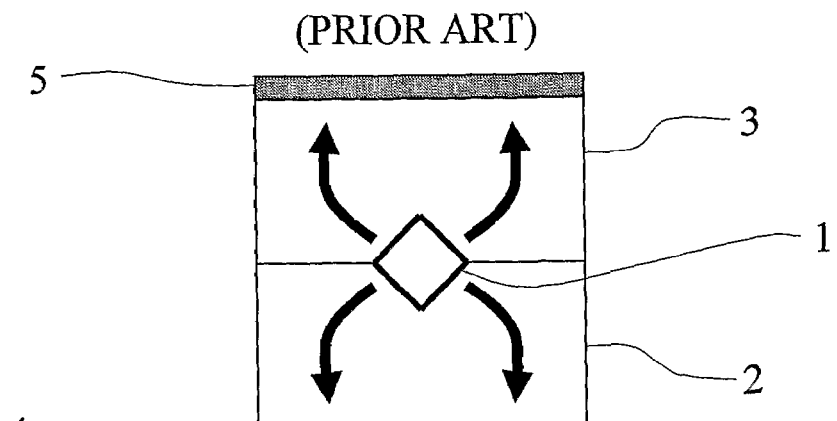
FIG. 1 is a sketch of a prior art optical mount.

In describing different embodiments of the present invention common reference numerals are used to describe like features. A prior art holder for a laser rod is shown in FIG. 1. The laser rod 1 is held between a lower 'V' block 2 and an upper 'V' block 3. The pair of 'V' blocks are pushed together so as to firmly contact all sides of the laser rod. Heat from the laser rod is conducted into the blocks as indicated by the arrows. A lower heat sink 4 and an upper heat sink 5 absorb excess heat and provide temperature control. Typically the heat sinks 4, 5 are Peltier chip devices or water cooling coils.

The prior art device of FIG. 1 requires two temperature control devices which adds cost. The temperature control devices must be well matched to avoid the introduction of systemic heat differentials between the blocks. A high mechanical tolerance is also required if good contact is to be maintained along the full length of the rod on all faces.

Figure 2:
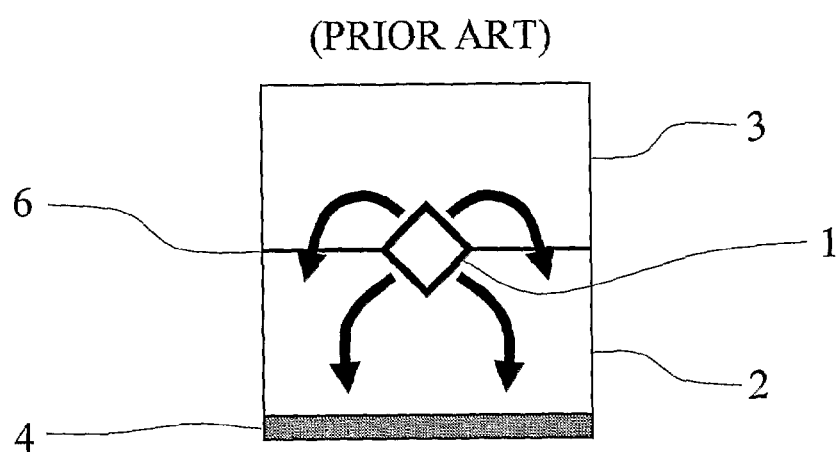
FIG. 2 is a sketch of another prior art optical mount.

Another prior art mounting block is shown in FIG. 2. The design is similar to that of FIG. 1 but only a single lower heat sink 4 is used to reduce cost. An indium foil 6 is placed between the 'V' blocks to conduct heat from one block to the other. The heat flow is depicted by the arrows. This design reduces cost and removes the problem of possible differences between the heat sinks but a very high mechanical tolerance is required to maintain good contact between the full length of the rod on all faces and also the faces that adjoin the upper and lower blocks. The result of this is usually a thermal gradient between the top of the upper block 3 and the bottom of the lower block 2 adjacent the heat sink 4. In addition, the designs shown in FIG. 1 and FIG. 2 will introduce variable mechanical stress and thermal conductivity as the rod expands and contracts due to heat produced during pumping. United States patent application 2004/0165625 describes a design which is similar to FIG. 2 where springs are used to hold upper 'V' block 3 in place and to reduce the risk of damage to the optical element when thermal expansion occurs. The main disadvantage of this design is that if thermal expansion occurs which is sufficient to cause the holding piece to push away from the lower 'V' block 2, thermal transfer from the upper 'V' block 3 to the lower 'V' block 2 will be lost on one or both sides and poor thermal stability will result.

Figure 3:
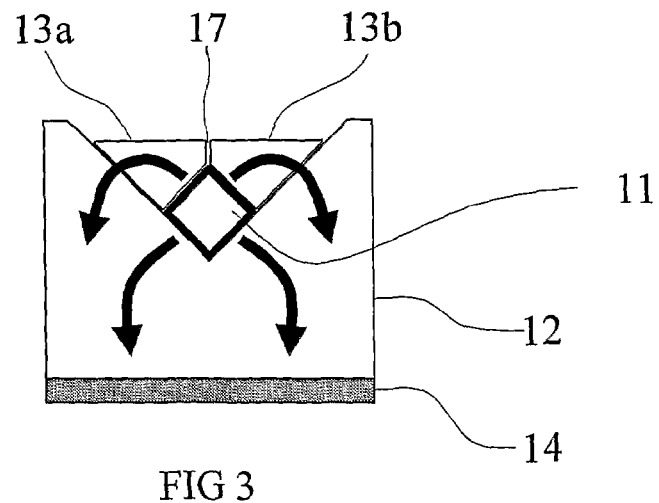
FIG. 3 is a sketch of an optical mount with improved thermal stability.

An optical mount having improved thermal stability is shown in FIG. 3. The laser rod 11 is seated in a lower 'V' block 12 (base) with an adjacent heat sink 14. The shape of the 'V' in the 'V' block 12 is carefully machined to ensure good contact between the faces of the laser rod 11 and the surface of the 'V' block 12. A pair of contact blocks in the form of wedges 13a, 13b are shaped to sit against one face of the laser rod 11 and against an adjacent face of the 'V' block. Thermal conduction from the laser rod to the heat sink via the wedges and 'V' block is indicated by the arrows.

A small air gap 17 is maintained between the wedges to avoid inducing mechanical stress. The wedges are held firmly against the laser rod to achieve good thermal conduction.

Figure 4:
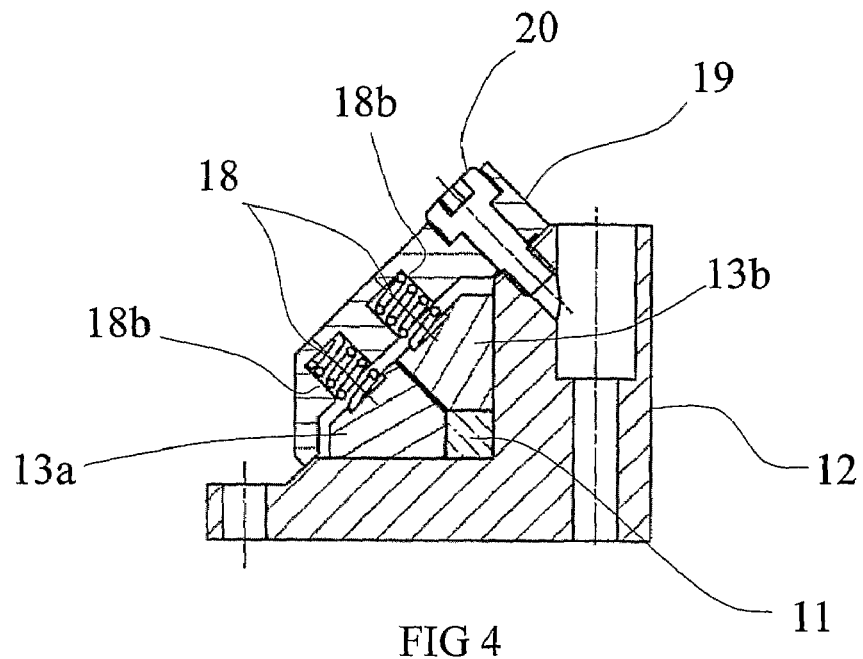
FIG. 4 is a cross-sectional view of a laser rod holder based on the optical mount of FIG. 3.
Figure 5:
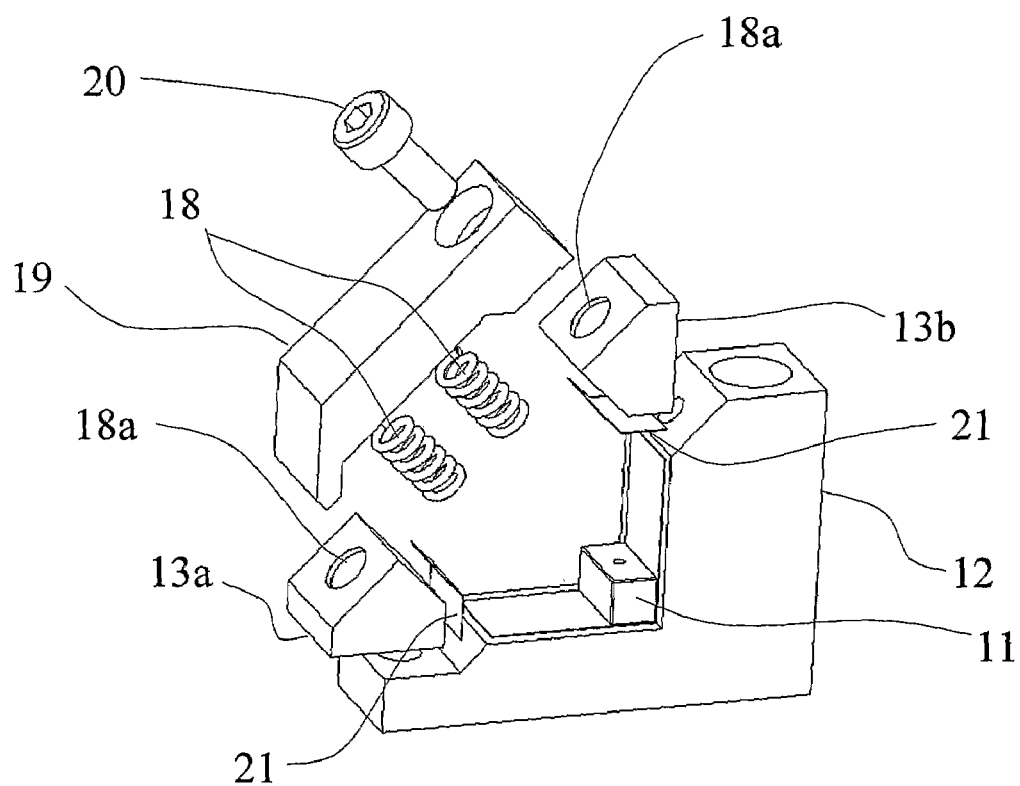
FIG. 5 is an exploded view of the laser rod holder of FIG. 4.

A cross-sectional view of a laser rod holder built according to the principle of FIG. 3 is shown in FIG. 4 and an exploded view is shown in FIG. 5. The laser rod 11 is located in the corner of a relatively large 'V' block base 12. Contact block wedges 13a, 13b are held against the laser rod and the 'V' block by springs 18. There is one spring for each wedge. The springs are each seated in a cup 18a formed in each wedge and a socket 18b in a clamp 19. The clamp 19 is attached to the 'V' block 12 by bolt 20.

The clamp 19, wedges 13 and 'V' block 12 are made from the same material and therefore have the same thermal properties. The springs 18 provide sufficient force against the wedges 13 to maintain good thermal contact but allow for minor movement thereby compensating for thermal effects.

A key feature of this design is that both wedges 13a and 13b can move independently and still maintain full contact and therefore full and homogenous thermal transfer with both the laser rod 11 and the lower 'V' block 12.

The inventor has found that the laser rod holder shown in FIG. 4 and FIG. 5 has superior performance over those known in the prior art providing homogenous and stable thermal conduction under variable pumping conditions while providing precise mechanical location.

The optical mount may be manufactured from any material having good thermal conductivity. The inventors have found that copper and aluminium are both suitable and indium foil 21 or a thermal transfer compound can be placed between the laser rod surfaces and the metal surfaces of the 'V' block and contact blocks to improve thermal conductivity.

Throughout the specification the aim has been to describe the invention without limiting the invention to any particular combination of alternate features.

The invention claimed is:

1. An optical mount comprising:
   a base shaped to receive an optical element in close contact on two faces of the optical element;
   two or more contact blocks shaped to contact the base and the optical element;
   one or more bias means located to urge said contact blocks into contact with said optical element and said base, wherein the bias means provide sufficient force to maintain good thermal contact but allow for minor movement thereby compensating for thermal effects; and
   wherein the contact blocks and the base are made from material with good thermal conductivity.

2. The optical mount of claim 1 wherein the optical element is rectangular and the base is a 'V' block having a corner shape adapted to receive a corner of the optical element so that two faces of the optical element are in contact with the base.

3. The optical mount of claim 1 wherein the contact blocks have matching shaped faces so that at least one face is in contact with a face of the optical element and one face is in contact with the base.

4. The optical mount of claim 1 wherein the bias means are springs which act against the contact blocks to push them towards the optical element and the base.

5. The optical mount of claim 1 further comprising a clamping member that is bolted to the base and extends around, but spaced from, the contact blocks.

6. The optical mount of claim 5 wherein the bias means are springs located between the clamping member and the contact blocks.

7. The optical mount of claim 1 wherein the optical element is a laser rod.

8. The optical mount of claim 1 further comprising heat transfer material between the faces of the contact blocks and the optical element.

9. The optical mount of claim 1 further comprising heat transfer material and between the contact blocks and the base.

10. The optical mount of claim 1 wherein contact blocks and the base are made from copper or aluminium.

11. The optical mount of claim 1 wherein both contact blocks can move independently while maintaining full contact with the optical element and the base.

12. The optical mount of claim 1 having two contact blocks with an air gap between the contact blocks.

\* \* \* \* \*